United States Patent
He et al.

(10) Patent No.: US 11,907,561 B2
(45) Date of Patent: Feb. 20, 2024

(54) DATA BACKUP METHOD AND APPARATUS

(71) Applicant: HUAWEI CLOUD COMPUTING TECHNOLOGIES CO., LTD., Gutan New District (CN)

(72) Inventors: Xionghui He, Shenzhen (CN); Chen Ding, Hangzhou (CN); Di Yao, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 224 days.

(21) Appl. No.: 16/928,677

(22) Filed: Jul. 14, 2020

(65) Prior Publication Data
US 2020/0341862 A1 Oct. 29, 2020

Related U.S. Application Data

(63) Continuation of application No. PCT/CN2019/080936, filed on Apr. 2, 2019.

(30) Foreign Application Priority Data

Jun. 15, 2018 (CN) .......................... 201810623103.1

(51) Int. Cl.
*G06F 3/06* (2006.01)
*G06F 11/14* (2006.01)

(52) U.S. Cl.
CPC ............ *G06F 3/0646* (2013.01); *G06F 3/061* (2013.01); *G06F 3/065* (2013.01); *G06F 3/067* (2013.01);

(Continued)

(58) Field of Classification Search
CPC .. G06F 3/065; G06F 11/1451; G06F 11/1469; G06F 21/31; G06F 11/1458;
(Continued)

(56) References Cited

U.S. PATENT DOCUMENTS 7,472,242 B1 * 12/2008 Deshmukh .......... G06F 11/1451
711/162
8,819,362 B1 * 8/2014 Duprey ............... G06F 11/2082
711/162

(Continued)

FOREIGN PATENT DOCUMENTS

CN 101201765 A 6/2008
CN 102999400 A 3/2013
(Continued)

*Primary Examiner* — Paul M Knight
(74) *Attorney, Agent, or Firm* — Leydig, Voit & Mayer, Ltd.

(57) ABSTRACT

This application provides a data backup method. The method includes: obtaining, by a first node, an identifier of a backup execution node from a storage device; and backing up data of the first node in the storage device responsive to determining that an ID of the first node is the same as the ID of the backup execution node. The embodiments of this application can improve reliability of the data stored by the first node, and prevent a plurality of nodes from redundantly backing up duplicate data in the storage device. The techniques disclosed herein reduce resource consumption.

13 Claims, 4 Drawing Sheets

(52) U.S. Cl.
CPC .......... *G06F 3/0608* (2013.01); *G06F 3/0611* (2013.01); *G06F 3/0613* (2013.01); *G06F 3/0619* (2013.01); *G06F 3/0647* (2013.01); *G06F 3/0653* (2013.01); *G06F 11/1451* (2013.01); *G06F 11/1461* (2013.01); *G06F 11/1464* (2013.01); *G06F 11/1469* (2013.01)

(58) Field of Classification Search
CPC .. G06F 3/0647; G06F 11/1461; G06F 21/445; G06F 11/1448; G06F 11/1466; G06F 11/2094; G06F 3/0646; G06F 3/0608; G06F 3/061; G06F 3/0611; G06F 3/0613; G06F 3/067
See application file for complete search history.

(56) References Cited

U.S. PATENT DOCUMENTS

| | | | |
|---|---|---|---|
| 2008/0126856 A1 | 5/2008 | Levidow et al. | |
| 2013/0282661 A1 | 10/2013 | Habermann et al. | |
| 2016/0063026 A1* | 3/2016 | Mokhtarzada | G06F 11/1451 707/617 |
| 2016/0162365 A1* | 6/2016 | Clark | G06F 11/1451 707/646 |
| 2019/0196981 A1* | 6/2019 | Silvert | G06F 3/0622 |

FOREIGN PATENT DOCUMENTS

| | | |
|---|---|---|
| CN | 104317676 A | 1/2015 |
| CN | 102088361 B | 4/2015 |
| CN | 105630630 A | 6/2016 |
| CN | 107819891 A | 3/2018 |
| CN | 109032837 A | 12/2018 |

\* cited by examiner

DATA BACKUP METHOD AND APPARATUS

CROSS-REFERENCE TO RELATED APPLICATIONS

This application is a continuation of International Patent Application No. PCT/CN2019/080936, filed on Apr. 2, 2019, which claims priority to Chinese Patent Application No. 201810623103.1, filed on Jun. 15, 2018. The disclosures of the aforementioned applications are hereby incorporated by reference in their entireties.

TECHNICAL FIELD

This application relates to the storage field, and more specifically, to a data backup method and apparatus.

BACKGROUND

A database is a key system of an enterprise. Data reliability is a key indicator of a public cloud platform. Therefore, a database backup function is a key mechanism of a database service. Data backup mainly includes a full backup and an incremental backup. For the incremental backup, a backup is periodically performed (that is, a backup is performed at a preset time interval) and only new data generated at the time interval is backed up.

Public cloud services are infrastructure and public facilities like water and electricity. The public cloud services are expected to be cost-effective and reliable, and the best services are expected to be provided with minimum management software and hardware costs. In a conventional solution, a relational database service (RDS) management system of a public cloud needs to manage a large quantity of nodes. A question of how to back up data in the node to improve reliability of the node needs to be urgently resolved.

SUMMARY

This application provides a data backup method and apparatus, to implement backup of data in a node. This improves reliability of the node.

According to a first aspect, a data backup method is provided. The method includes: obtaining, by a first node, an identifier (ID) of a backup execution node from a storage device; and when an ID of the first node is the same as the ID of the backup execution node, backing up, by the first node, data of the first node in the storage device.

In this embodiment of this application, the first node obtains the ID of the backup execution node from the storage device. When it is determined that the ID of the first node is the same as the ID of the backup execution node, the data of the first node is backed up in the storage device, or when it is determined that the ID of the first node is different from the ID of the backup execution node, the data does not need to be backed up in the storage device. This embodiment of this application can improve reliability of the data stored by the first node, and prevent a plurality of nodes from backing up data in the storage device in duplicate. This reduces resource consumption.

In some possible implementations, when the first node determines that the ID of the first node is the same as the ID of the backup execution node, the first node periodically backs up the data of the first node in the storage device.

The periodic backup may be performed at a preset moment, or may be performed at a plurality of consecutive preset moments. In this embodiment of this application, the data backup may be periodically triggered by the first node, and does not need to depend on centralized scheduling by a management device each time. This reduces power consumption overheads of the management device, and avoids reliability reduction of data backup when the management device has a scale performance bottleneck.

In some possible implementations, before the obtaining, by a first node, an ID of a backup execution node from a storage device, the method further includes: receiving, by the first node, an indication used to trigger a backup operation.

The management device can still control the first node to start to back up data in the storage device. This reduces power consumption overheads of the management device and improves flexibility of controlling the data backup of the first node by the management device.

In some possible implementations, the method further includes: obtaining, by the first node, last backup information from the storage device; and the backing up data of the first node in the storage device includes: determining, by the first node based on the last backup information, new data to be backed up in the first node, and performing incremental backup on the new data in the storage device.

The last backup information may include an end location and/or an end time of last backup. In this way, the first node may determine, based on the last backup information, the new data to be backed up, and continue to back up the new data in the storage device. This prevents duplicate data from being backed up in the storage device and reduces occupied resource in the storage device.

In some possible implementations, the method further includes: obtaining, by the first node, last backup information from the storage device; and the backing up data of the first node in the storage device includes: determining, by the first node based on the last backup information, new data to be backed up in the first node, and performing incremental backup on the new data in the storage device when a data amount of the new data is greater than a preset data amount.

If the data amount of the new data is greater than the preset data amount, the new data is backed up in the storage device. If the data amount of the new data is less than or equal to the preset data amount, the new data may be temporarily backed up in a local storage device, and when the data amount is greater than the preset data amount, the new data is backed up in the storage device together. This avoids data backup when the data amount is relatively small, and reduces backup overheads.

In some possible implementations, the method further includes: indicating, by the first node, the storage device to delete data whose storage time is greater than or equal to a preset time threshold.

The first node may delete expired data, to reduce occupied space in the storage device.

According to a second aspect, a data backup method is provided. The method includes: obtaining, by a storage device, an ID of a backup execution node; sending, by the storage device, the ID of the backup execution node to a first node; and receiving, by the storage device, data of the first node, and the data of the first node is sent by the first node when an ID of the first node is the same as the ID of the backup execution node.

In this embodiment of this application, the storage device obtains the identifier ID of the backup execution node, and sends the ID of the backup execution node to the first node, so that when the first node determines that the ID of the first node is the same as the ID of the backup execution node, the data of the first node is backed up in the storage device. This embodiment of this application can improve reliability of the data stored by the first node, and prevent duplicate data from being stored in the storage device. This reduces resource overheads.

In some possible implementations, the method further includes: obtaining, by the storage device, last backup information; sending, by the storage device, the last backup information, where the last backup information is used to determine new data to be backed up in the first node; and the receiving data of the first node in the storage device includes: receiving, by the storage device, the new data.

The storage device may store the last backup information, and send the last backup information to the first node, to prevent the first node from backing up duplicate data in the storage device. This reduces occupied storage space.

In some possible implementations, the method further includes: deleting, by the storage device, data whose storage time is greater than or equal to a preset time threshold.

The storage device deletes expired data. This reduces occupied storage space.

According to a third aspect, a data backup method is provided. The method includes: determining, by a management device, an ID of a backup execution node; and sending, by the management device, the ID of the backup execution node to a storage device, where the ID of the backup execution node is used to indicate that the storage device receives data sent by a first node whose ID is the same as the ID of the backup execution node.

In this embodiment of this application, the management device sends the identifier ID of the backup execution node in the storage device, and the ID of the backup execution node is used to indicate that the storage device receives the data sent by the first node whose ID is the same as the ID of the backup execution node. This embodiment of this application can improve reliability of the data stored by the first node, and prevent duplicate data from being stored in the storage device. This reduces resource overheads.

In some possible implementations, the method further includes: sending, by the management device to the first node, an indication used to trigger a backup operation.

The management device can still control the first node to start to back up data in the storage device. This reduces power consumption overheads of the management device and improves flexibility of controlling the data backup of the first node by the management device.

In some possible implementations, the method further includes: the sending, by the management device to the first node, an indication used to trigger a backup operation includes: sending, by the management device, the indication information to the first node when the first node completes full backup of the data of the first node in the storage device one time; or sending, by the management device, the indication information to the first node when switching is about to be performed to the first node, where the first node is a secondary node of the second node.

When the first node completes backup of all data of the first node in the storage device one time, the management device sends, to the first node, the indication used to trigger the backup operation. In this way, the first node can start to perform the backup, so that the first node backs up incremental data in the storage device in a next time period.

When a current node is faulty, and switching is about to be performed from the current node to the first node, the management device sends, to the first node, the indication used to trigger the backup operation. In this way, the first node can start to perform the backup, so that all data of the first node can be backed up in the storage device.

In some possible implementations, the method further includes: performing, by the management device, deduplication processing on a duplicate log message in a metadata database, where the metadata database is used to store a log message, and the log message is used to describe data backed up from a second node when the ID of the first node is the same as the ID of the backup execution node; and/or obtaining, by the management device from the storage device, a missing log message in the metadata database.

The missing log message is supplemented, and therefore point in time recovery can be implemented.

According to a fourth aspect, a data backup apparatus is provided. The apparatus is configured to perform the method according to any one of the first aspect or the possible implementations of the first aspect. Specifically, the apparatus includes units configured to perform the method according to any one of the first aspect or the possible implementations of the first aspect.

According to a fifth aspect, a data backup apparatus is provided. The apparatus is configured to perform the method according to any one of the second aspect or the possible implementations of the second aspect. Specifically, the apparatus includes units configured to perform the method according to any one of the second aspect or the possible implementations of the second aspect.

According to a sixth aspect, a data backup apparatus is provided. The apparatus is configured to perform the method according to any one of the third aspect or the possible implementations of the third aspect. Specifically, the apparatus includes units configured to perform the method according to any one of the third aspect or the possible implementations of the third aspect.

According to a seventh aspect, a data backup apparatus is provided. The apparatus includes a processor and a memory, where the memory is configured to store a computer-executable instruction, and the processor and the memory communicate with each other by using an internal connection path. When the apparatus runs, the processor executes the computer-executable instruction stored in the memory, to enable the apparatus to perform any one of the first aspect or the possible implementations of the first aspect.

According to an eighth aspect, a data backup apparatus is provided. The apparatus includes a processor, a memory, and an input/output interface, where the memory is configured to store a computer-executable instruction, and when the apparatus runs, the processor executes the computer-executable instruction stored in the memory, to enable the apparatus to perform any one of the second aspect or the possible implementations of the second aspect.

According to a ninth aspect, a data backup apparatus is provided. The apparatus includes a processor and a memory, where the memory is configured to store a computer-executable instruction, and the processor and the memory communicate with each other by using an internal connection path. When the apparatus runs, the processor executes the computer-executable instruction stored in the memory, to enable the apparatus to perform any one of the third aspect or the possible implementations of the third aspect.

According to a tenth aspect, a computer storage medium is provided. The computer storage medium includes a computer-execution instruction, and when a processor of a computer executes the computer-execution instruction, the computer performs any one of the first aspect to the third aspect and the possible implementations of the first aspect to the third aspect.

According to an eleventh aspect, a chip is provided. The chip includes a processor and a memory, the processor is configured to execute an instruction stored in the memory, and when the instruction is executed, the processor may implement any one of the first aspect, the third aspect, and the possible implementations of the first aspect or the third aspect.

According to a twelfth aspect, a computer program is provided. When the computer program is executed on a computer, the computer is enabled to implement any one of the first aspect to the third aspect and the possible implementations of the first aspect to the third aspect.

Based on the foregoing technical solution, the first node obtains the ID of the backup execution node from the storage device. When it is determined that the ID of the first node is the same as the ID of the backup execution node, the data of the first node is backed up in the storage device, or when it is determined that the ID of the first node is different from the ID of the backup execution node, the data does not need to be backed up in the storage device. The embodiments of this application can improve reliability of the data stored by the first node, and prevent a plurality of nodes from backing up data in the storage device in duplicate. This reduces resource consumption.

DESCRIPTION OF EMBODIMENTS

The following describes technical solutions of this application with reference to accompanying drawings.

Figure 1:
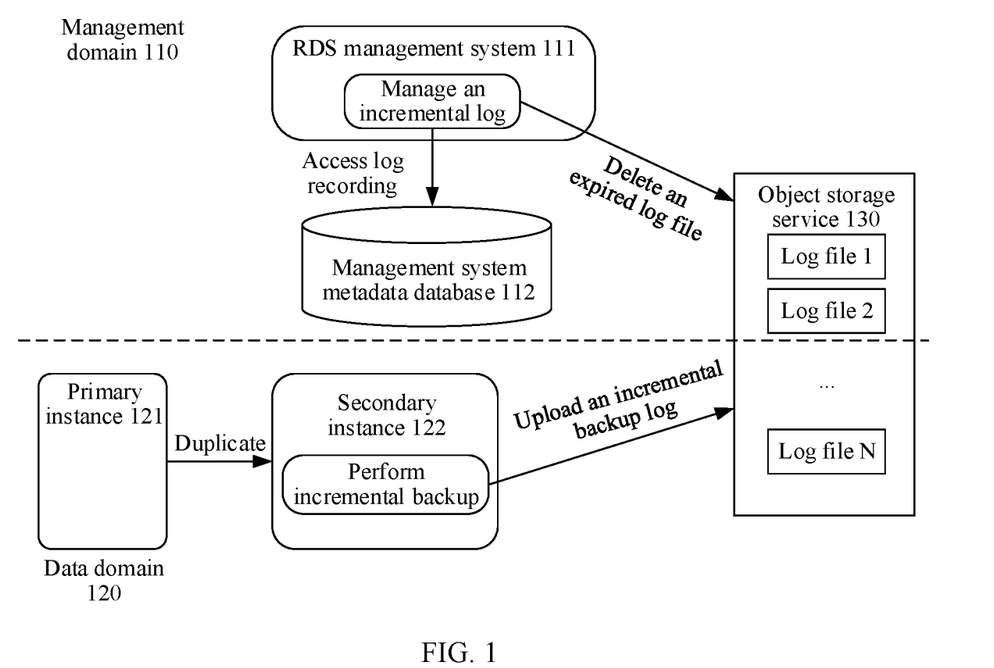
FIG. 1 is a schematic diagram of a system architecture according to an embodiment of this application.

FIG. 1 is a schematic diagram of a system architecture according to an embodiment of this application. As shown in FIG. 1, the system architecture includes a management domain 110, a data domain 120, and an object storage service (OBS) system 130. The management domain 110 includes an RDS management system 111 and a management system metadata database 112, and the data domain 120 includes a primary instance 121 and a secondary instance 122. The secondary instance 122 backs up data from the primary instance 121 and stores the data in the object storage service system 130. The RDS management system 111 can control data in the object storage service system 130.

It should be noted that the object storage service system 130 stores the data backed up by the secondary instance 122 from the primary instance 121, and data backed up one time may be referred to as one "log file". Parameter information that describes the data, such as size, type, and the like, is stored in the management system metadata database 112, and information stored in the management system metadata database 112 may be referred to as "log recording".

It should be understood that the management domain may also be referred to as a "management plane", and the data domain may also be referred to as an "instance plane". Terms with a same meaning are not distinguished in this application.

It should be further understood that the primary instance or the secondary instance in this embodiment of this application may be software on a node.

Figure 2:
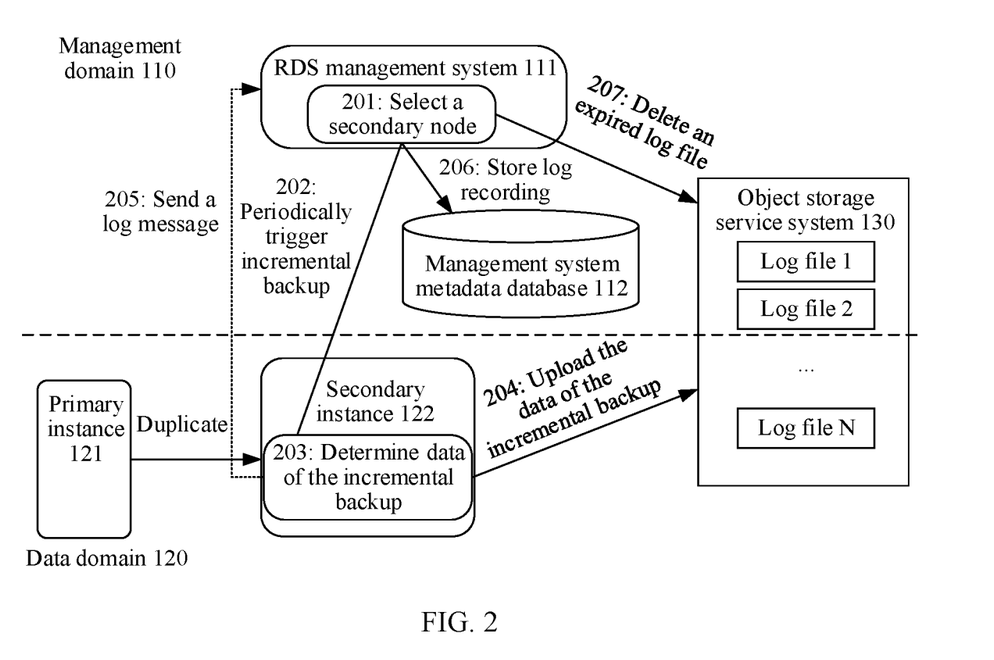
FIG. 2 is a schematic diagram of a data backup method in a conventional solution.

FIG. 2 is a schematic diagram of data backup in a conventional solution. An RDS management system in a management domain centrally manages incremental backup of all instances. Specific data backup steps are as follows.

201: An RDS management system 111 selects an appropriate secondary node, where a secondary instance 122 in the selected secondary node is used to back up data in a primary instance 121.

202: The RDS management system 111 periodically triggers the selected secondary instance 122 to perform incremental backup.

203: The selected secondary instance 122 determines data of the incremental backup.

204: The selected secondary instance 122 stores the data of the incremental backup in an object storage service system 130.

205: The selected secondary instance 122 sends a log message to the RDS management system 111.

206: The RDS management system 111 stores the log message in a management system metadata database 112.

207: The RDS management system 111 may further centrally clear expired data of the object storage service system 130.

Figure 3:
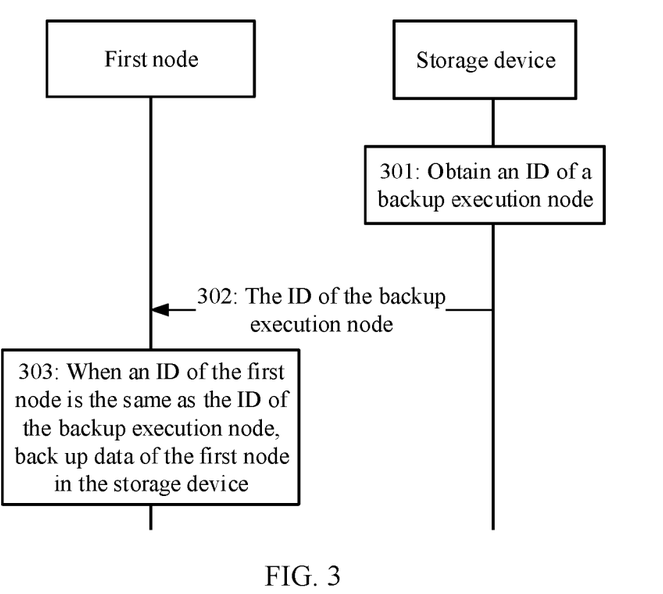
FIG. 3 is a schematic flowchart of a data backup method according to an embodiment of this application.

FIG. 3 is a schematic flowchart of data backup according to an embodiment of this application.

301: A storage device obtains an identifier (ID) of a backup execution node.

In some embodiments, the ID of the backup execution node may be sent by a management device to the storage device, or may be preset.

In some embodiments, an object storage service (OBS) system may be deployed on the storage device.

In some embodiments, the first node may actively obtain the ID of the backup execution node. Alternatively, the storage device actively sends the ID of the backup execution node to the first node, in other words, the first node receives the ID of the backup execution node.

302: The first node obtains the ID of the backup execution node from the storage device.

Specifically, that the first node obtains the ID of the backup execution node may be receiving a file format of the ID. For example, the file format may be dbs_{instanceId}_incLog_node_id, and the ID of the backup execution node is obtained based on node_id in the file format.

It should be noted that the first node may be a primary node or a secondary node. This is not limited in this application.

In some embodiments, an RDS management system, a cloud service management system (for example, a structured query language (SQL) service system, a MySQL service system, or a PG service system), or the like may be deployed on the management device. This is not limited in this application.

303: When the first node determines that an ID of the first node is the same as the ID of the backup execution node, the first node backs up data of the first node in the storage device.

Specifically, the first node determines whether the ID of the first node is the same as the ID of the backup execution node. When the first node determines that the ID of the first node is the same as the ID of the backup execution node, the first node backs up the data of the first node in the storage device. In other words, the first node sends the data to the storage device, and the storage device stores the data. When the first node determines that the ID of the first node is different from the ID of the backup execution node, the first node does not need to back up the data in the storage device. This embodiment of this application can improve reliability of the data stored by the first node, and prevent a plurality of nodes from redundantly backing up data in the storage device. This reduces resource consumption.

It should be noted that, that the backing up of data in the storage device may refer to backing up all data in the storage device, or may refer to backing up only data incremented by the first node within a time interval (which may also be referred to as "incremental data"). This is not limited in this application.

It should be noted that, the data stored by the first node is the same as data stored by a second node, and the first node and the second node are mutually primary and secondary nodes. To be specific, the data backed up in the storage device may be the same as the data or the incremental data stored by the first node, or may be the same as the data or incremental data of the second node. Alternatively, the data backed up in the storage device may be the same as the incremental data stored by the first node, or may be the same as incremental data of the second node.

It should be understood that the second node may be a primary node, and the first node is a secondary node. Alternatively, the first node is a primary node, and the second node is a secondary node.

It should be further understood that, in this embodiment of this application, the first node determines whether the ID of the first node is the same as the ID of the backup execution node, and when the ID of the first node is the same as the ID of the backup execution node, a design of performing data backup may be referred to as an "anti-brain-split" design.

In some embodiments, when the first node determines that the ID of the first node is the same as the ID of the backup execution node, the first node periodically backs up the data of the first node in the storage device.

Specifically, in this embodiment of this application, data backup may be periodically triggered by the first node, and does not need to depend on centralized scheduling by a management device each time. This reduces power consumption overheads of the management device, and avoids reliability reduction of data backup when the management device has a scale performance bottleneck.

It should be noted that the periodic backup may be performed at a preset moment, or may be performed at a plurality of consecutive preset moments. The periodic backup may be backing up the data of the second node at moments of a same time interval (for example, the data of the second node is backed up at an interval of 5 minutes). Alternatively, the periodic backup may be backing up the data of the second node at moments of different preset time intervals (for example, the data of the second node is separately backed up at intervals of 5 minutes, 3 minutes, and 7 minutes).

In some embodiments, the first node may further obtain last backup information from the storage device. New data to be backed up in the first node is determined based on the last backup information, and incremental backup is performed on the new data in the storage device.

Specifically, the last backup information may include an end location and/or an end time of last backup. In this way, the first node may determine, based on the last backup information, the new data to be backed up, and continue to back up the new data in the storage device. This prevents duplicate data from being backed up in the storage device and reduces occupied resource in the storage device.

The last backup information can be included in a file having a file format of dbs_{instanceId}_{nodeId}_last_incLog_info, and the end position and/or the end time of the last backup information is learned based on last_incLog_info.

It should be noted that the storage device includes a file that is corresponding to each node in a plurality of nodes and that stores the last backup information. When a node is switched, the storage device may duplicate last backup information stored in a file corresponding to a node before the switching to a file corresponding to a node after the current switching. In this way, the node after the switching may obtain the last backup information from the file corresponding to the node after the switching in the storage device.

In some embodiments, the first node obtains the last backup information from the storage device. The new data to be backed up in the first node is determined based on the last backup information, and incremental backup is performed on the new data in the storage device when a data amount of the new data is greater than a preset data amount.

Specifically, the first node determines the new data based on the obtained last backup information, and determines, based on the data amount of the new data, whether the new data needs to be backed up in the storage device. If the data amount of the new data is greater than the preset data amount, the new data is backed up in the storage device. If the data amount of the new data is less than or equal to the preset data amount, the new data may be temporarily backed up in a local storage device, and when the data amount is greater than the preset data amount, the new data is backed up in the storage device together. This avoids data backup when the data amount is relatively small, and reduces backup overheads.

In some embodiments, the first node may start to perform backup when it is determined that the ID of the first node is the same as the obtained ID of the backup execution node.

Specifically, the management device may control, by controlling whether the ID of the backup execution node is sent to the storage device, whether the first node can start to perform the backup, or the first node automatically starts to perform the backup at a preset time interval. This is not limited in this application.

In some embodiments, the first node may further receive an indication used to trigger a backup operation.

Specifically, the management device may specifically send the indication used by the first node to perform the backup operation. In other words, the management device controls whether the first node can start to perform the backup. If the first node receives indication information, the first node can start to perform the backup. If the first node does not receive indication information, the first node cannot start to perform the backup.

For example, the first node can start to perform the backup, and may trigger the first node to obtain the ID of the backup execution node.

In some embodiments, when the first node completes backup of all data of the first node in the storage device one time, the management device sends, to the first node, the indication used to trigger the backup operation. In this way, the first node can start to perform the backup, so that the first node backs up incremental data in the storage device in a next time period.

It should be understood that, that completing a backup of all data of the first node in the storage device one time may refer to that the first node completes a backup of all data for the first time, or may complete a backup of all data at a time after the first time. This is not limited in this application.

In some embodiments, when a current node is faulty, and switching is about to be performed from the current node to the first node, the management device sends, to the first node, the indication used to trigger the backup operation. In this way, the first node can start to perform the backup, so that the data can be backed up in the storage device.

Specifically, the management device sends, to the first node, the indication used to trigger the backup operation, so that the first node can back up all data in the storage device.

It should be noted that data of different nodes is backed up in different files in the storage device.

In some embodiments, when an original node cannot back up data in the storage device, the management device may perform switching from the original node to the first node.

Specifically, that an original secondary node backs up data in the storage device may be that the ID of the backup execution node cannot be obtained, or the last backup information cannot be read.

In some embodiments, the original secondary node may send a backup failure message to the management device, and the management device triggers switching from the original node to the first node according to the backup failure message.

In some embodiments, the original secondary node may directly send the backup failure message to the management device, or may send the backup failure message through forwarding by using middleware. This is not limited in this application.

In some embodiments, a monitoring module may be disposed in the management device, and the monitoring module is used to determine whether the current node can back up the data in the storage device.

In some embodiments, the first node may stop backing up the data of the second node according to a preset duration of periodically backing up the data in the storage device.

For example, duration of backing up the data in the storage device at a preset interval of 5 minutes is 18 minutes. In this way, the first node may perform three times of data backup, and then stop backing up of the data.

It should be noted that the preset duration of periodically backing up the data in the storage device may be set by the first node, or may be set by the management device. This is not limited in this application.

In some embodiments, after the management device implements the switching from the original node to the first node, in other words, the first node completes a backup of the data in the storage device, the management device may further send backup stop indication information, and the first node stops backing up the data according to the backup stop indication information.

In some embodiments, the management device may further send, to the first node, environment information required for the backup. The environment information may include an instance ID, a node ID, an OBS address, an OBS bucket, and an OBS access credential.

Specifically, the management device may periodically back up data in the storage device based on the environment information.

It should be noted that the management device may separately send the environment information to the first node, or the environment information may be included in the indication information used to indicate that the first node can start to perform the backup. This is not limited in this application.

It should be understood that the environment information may also be referred to as "initialization-related information".

In some embodiments, the first node directly sends a log message to the management device, or may send a log message to the management device by using middleware. The log message is used to describe data backed up in the storage device.

In some embodiments, the middleware may be a distributed publish-subscribe message system (kafka), or may be a Rabbit message queue (MQ), an active MQ, or a Zero MQ. This is not limited in this application.

In some embodiments, the management device may perform deduplication processing on a log message duplicated with another log message in a metadata database, or supplement a missing log message in the metadata database.

Specifically, after sending the log message to the management device, the first node may complete backup of data in the storage device. If the first node does not complete the backup of the data in the storage device, and a link between the first node and the storage device is interrupted, the first node needs to back up the data in the storage device again. In this case, the management device may receive the log message twice, in other words, the management device has the log message, which is a duplicate of another log message. Alternatively, in a process of switching the secondary node, after the original node just confirms new data and sends a log message, node switching occurs. In this case, the management device may also receive the log message twice, in other words, the management device has the log message, which is a duplicate of another log message.

If the log message is a duplicate of another log message that exists in the management device, the management device may delete the duplicate log message from the metadata database, or supplement the missing log message, so that point in time recovery (PITR) is not affected.

For example, the management device may list log messages in the metadata database, and delete the duplicate log message. The management device may obtain the missing log message from the storage device in an enumeration manner, and store the missing log message in the metadata database to supplement the metadata database.

In some embodiments, the management device may delete a log message from a plurality of duplicate log messages based on a start moment of the log message, a start log location, and a log message of data indicated by last backup information.

Specifically, duplicating of the log message may be duplicating in a part of time or a part of location. The management device may select, from the plurality of duplicate log messages, a log message that is most closely connected to the log message of the data indicated by the last backup information as a final log message, and delete other log messages. If start positions of the log messages are the same, a log message with a larger log position is selected as a valid log message, and other log messages are deleted.

It should be noted that the close connection between the log messages may be a time close connection, a location close connection, or a combination of a time close connection and a location close connection. This is not limited in this application.

It should be understood that if both start moments and start log locations of the plurality of duplicate log messages are the same, other log messages may be randomly deleted and only one log message is left.

It should be further understood that if the metadata database does not store incremental data in a period of time, PITR cannot be performed. This period of time may be referred to as a "black hole".

In some embodiments, the first node may indicate the storage device to delete data whose storage time is greater than or equal to a preset time threshold.

Specifically, the first node may periodically detect data stored locally, and send deletion information to the storage device. The deletion information is used to indicate the storage device to delete the data whose storage time is greater than or equal to the preset time threshold. The first node stores data in a local storage module. The first node may periodically scan a data list, and send the deletion information to the storage device. The deletion information may indicate the storage device to delete the data whose storage time is greater than or equal to the preset time threshold. In addition, the first node may delete the data whose storage time is greater than or equal to the preset time threshold, or mark that the data has been deleted from the storage device. This is not limited in this application.

It should be noted that the preset time threshold may be a storage time of the data in the local storage module of the first node, or may be a storage time of the data in the storage device. This is not limited in this application.

In some embodiments, the first node may further send, to the storage device, an end time and/or an end location of backing up the data of the second node, so that the end time and/or the end location are/is used as last backup information of a data backup.

It should be noted that the first node may separately send the end time and/or the end location of backing up the data of the second node, or the storage device may duplicate, from a currently stored log file, an end time and/or an end location of data backed up from the first node to a last backup information file.

Therefore, according to the data backup method in this embodiment of this application, the first node obtains the ID of the backup execution node from the storage device, and when the first node determines that the ID of the first node is the same as the ID of the backup execution node, the data of the first node is backed up in the storage device. This embodiment of this application can improve reliability of the data stored by the first node, and prevent a plurality of nodes from redundantly backing up data in the storage device. This reduces resource overheads.

Figure 4:
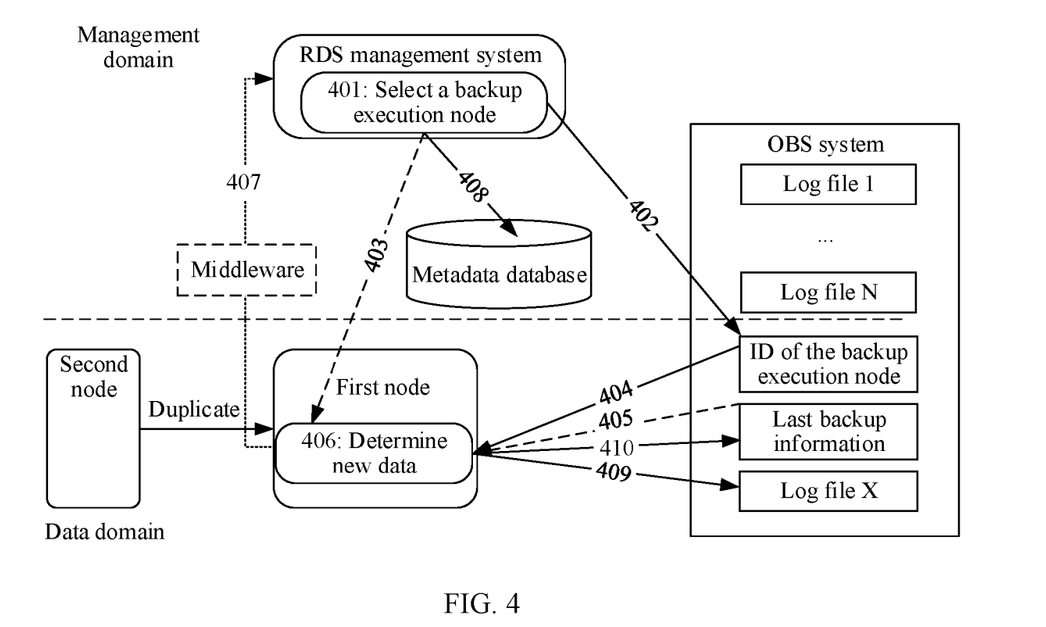
FIG. 4 is a schematic diagram of a data backup method according to an embodiment of this application.

FIG. 4 is a schematic flowchart of a data backup method according to an embodiment of this application.

The following embodiment is described by using an example in which an RDS management system is deployed on a management device, and an OBS system is deployed on a storage device.

401: An RDS management system selects a backup execution node (for example, denoted as a first node).

402: The RDS management system sends a device ID of the backup execution node to an OBS system.

403: The RDS management system sends, to the first node, an indication used to trigger a backup operation.

404: The first node obtains the ID of the backup execution node from the OBS system.

405: The first node obtains last backup information from the OBS system, so that the first node can determine new data based on the last backup information, to avoid a duplicate backup.

It should be noted that a sequence of step 403, step 404, and step 405 is not limited in this application.

406: The first node determines whether the ID of the backup execution node is the same as an ID of the first node, and determines the new data based on the last backup information.

407: The first node sends a log message to the RDS management system, where the log message is used to describe data backed up from a second node.

In some embodiments, sending a log message to the RDS management system may be implemented through forwarding by middleware.

408: The RDS management system stores the log message in a metadata database, so that PITR can be performed.

409: When the ID of the backup execution node is the same as the ID of the first node, the first node backs up the new data in the storage device, for example, in a log file X in FIG. 4.

410: The first node may further send an end location and/or an end time of the data to the OBS system, to use the end location and/or the end time as last backup information of a data backup.

It should be understood that the specific examples in this embodiment of this application are merely intended to help a person skilled in the art better understand the embodiments of this application, rather than limit the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the data backup method according to the embodiments of this application. The following describes a data backup apparatus according to the embodiments of this application.

Figure 5:
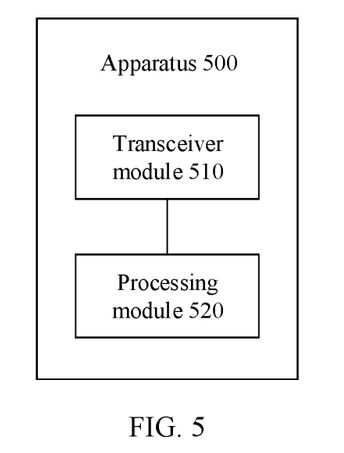
FIG. 5 is a schematic block diagram of a data backup apparatus according to an embodiment of this application.

FIG. 5 is a schematic block diagram of a data backup apparatus 500 according to an embodiment of this application.

It should be understood that the apparatus 500 may be corresponding to the first node in the method embodiments, and may have any function of the first node in the method. The apparatus 500 includes a transceiver module 510 and a processing module 520.

The transceiver module 510 is configured to obtain an identifier (ID) of a backup execution node from a storage device.

The processing module 520 is configured to: when an ID of the first node is the same as the ID of the backup execution node, back up data of the first node in the storage device.

In some embodiments, the transceiver module 510 is further configured to receive an indication used to trigger a backup operation.

In some embodiments, the transceiver module 510 is further configured to obtain last backup information from the storage device.

The processing module 520 is specifically configured to: determine, based on the last backup information, new data to be backed up in the first node, and perform incremental backup on the new data in the storage device.

In some embodiments, the transceiver module 510 is further configured to obtain last backup information from the storage device.

The processing module 520 is specifically configured to: determine, based on the last backup information, new data to be backed up in the first node, and perform incremental backup on the new data in the storage device when a data amount of the new data is greater than a preset data amount.

In some embodiments, the processing module 520 is further configured to indicate the storage device to delete data whose storage time is greater than or equal to a preset time threshold.

In some embodiments, the data backup apparatus 500 in this embodiment of this application may be the first node, or may be a chip in the first node.

It should be understood that the data backup apparatus 500 according to this embodiment of this application may be corresponding to the first node in the data backup method in the embodiment in FIG. 3 or FIG. 4. In addition, the foregoing and other management operations and/or functions of the modules in the data backup apparatus 500 are respectively used to implement corresponding steps of the foregoing methods. For brevity, details are not described herein again.

Figure 6:
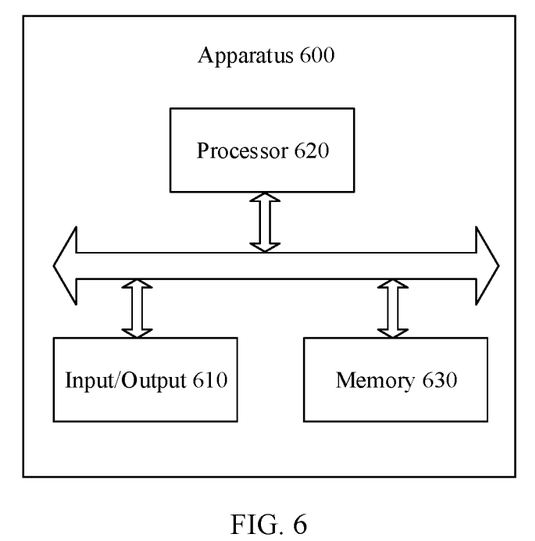
FIG. 6 is a schematic structural diagram of a data backup apparatus according to an embodiment of this application.

In some embodiments, if the data backup apparatus 500 is the first node, the transceiver module 510 in this embodiment of this application may be implemented by an input/output interface 610, and the processing module 520 may be implemented by a processor 620. As shown in FIG. 6, the data backup apparatus 600 may include the input/output interface 610, the processor 620, and a memory 630. The memory 630 may be configured to store indication information, or may be configured to store code, an instruction, and the like that are executed by the processor 620. The input/output interface 610 may include a radio frequency circuit. In some embodiments, the first node further includes a storage unit.

The storage unit may be, for example, a memory. When the first node includes the storage unit, the storage unit is configured to store a computer-executable instruction, the processing unit is connected to the storage unit, and the processing unit executes the computer-executable instruction stored in the storage unit, to enable the first node to perform the foregoing data backup method.

In some embodiments, if the data backup apparatus 500 is the chip in the first node, the chip includes the processing module 520 and the transceiver module 510. The transceiver module 510 may be implemented by the input/output interface 610, and the processing module 540 may be implemented by the processor 620. The transceiver module may be, for example, an input/output interface, a pin, or a circuit. The processing module may execute the computer-executable instruction stored in the storage unit. The storage unit is a storage unit in the chip such as a register or a buffer. Alternatively, the storage unit may be a storage unit in the terminal but outside the chip such as a read-only memory (ROM), another type of static storage device capable of storing static information and instructions, or a random access memory (RAM).

The processor 620 may be a general-purpose central processing unit (CPU), a microprocessor, an application-specific integrated circuit (ASIC), or one or more integrated circuits configured to perform the technical solutions in the embodiments of this application. Alternatively, the processor may be one or more devices, circuits, and/or processing cores for processing data (for example, a computer program instruction).

According to a specific implementation, in an embodiment, the processor 620 may include one or more CPUs.

According to a specific implementation, in an embodiment, the apparatus 600 may include a plurality of processors. These processors may be single-core (single-CPU) processors or multi-core (multi-CPU) processors.

In this embodiment of this application, the processor 620 may perform processing-related functions such as information, a signal, and data in the technical solutions provided in the following embodiments of this application, and the communications interface may receive and/or send the foregoing information, the signal, the data, and the like.

It should be understood that, the processor 62 may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

Figure 7:
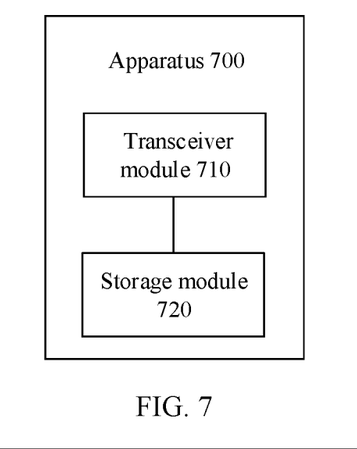
FIG. 7 is a schematic block diagram of a data backup apparatus according to an embodiment of this application.

FIG. 7 shows a data backup apparatus 700 according to an embodiment of this application. The data backup apparatus 700 may be a storage device.

It should be understood that the data backup apparatus 700 may be corresponding to the storage device in the method embodiments, and may have any function of the storage device in the method. The apparatus 700 includes a transceiver module 710 and a storage module 720.

The transceiver module 710 is configured to obtain an identifier (ID) of a backup execution node.

The transceiver module 710 is further configured to send the backup execution node to a first node, and the ID of the backup execution node is used by the first node to determine whether an ID of the first node is the same as the ID of the backup execution node.

The transceiver module 710 is further configured to receive data of the first node, and the data of the first node is sent by the first node when the ID of the first node is the same as the ID of the backup execution node.

In some embodiments, the transceiver module 710 is further configured to obtain last backup information.

The transceiver module 710 is further configured to send the last backup information, and the last backup information is used to determine new data to be backed up in the first node.

The transceiver module 710 is specifically configured to: receive the new data.

In some embodiments, the storage module 720 is configured to delete data whose storage time is greater than or equal to a preset time threshold.

It should be understood that the data backup apparatus 700 according to this embodiment of this application may be corresponding to the storage device in the data backup method in the embodiment in FIG. 3 or FIG. 4. In addition, the foregoing and other management operations and/or functions of the modules in the data backup apparatus 700 are respectively used to implement corresponding steps of the foregoing methods. For brevity, details are not described herein again.

Figure 8:
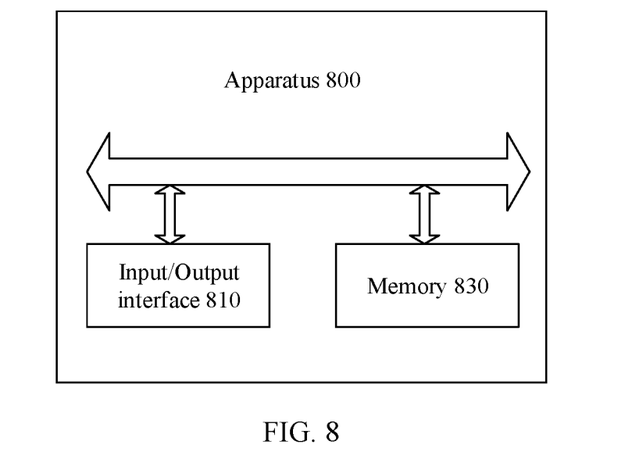
FIG. 8 is a schematic structural diagram of a data backup apparatus according to an embodiment of this application.

In some embodiments, if the data backup apparatus 700 is a storage device, the transceiver module 720 in this embodiment of this application may be implemented by an input/output interface 810 shown in FIG. 8, and the storage module 720 may be implemented by a memory 830. There may be one or more memories or input/output interfaces.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Storing in this application may be storing in one or more memories. The one or more memories may be disposed separately, or may be integrated into an encoder or a decoder, a processor, a chip, a data backup apparatus, or a terminal. Alternatively, some of the one or more memories may be disposed separately, or may be integrated into a decoder, a processor, a chip, a communications apparatus, or a terminal. The memory may be any form of storage medium. This is not limited in this application.

The memory 830 may be configured to store indication information, or may be configured to store code, an instruction, and the like that are executed by the processor 88.

It may be understood that the memory 630 or the memory 830 in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that the memory of the systems and methods described in this specification includes but is not limited to these and any memory of another proper type.

Figure 9:
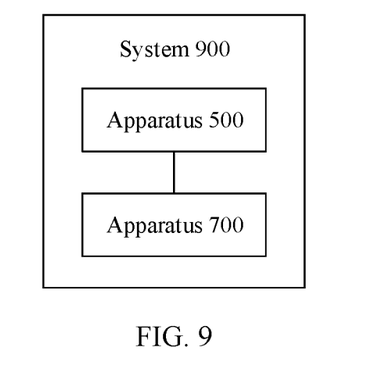
FIG. 9 is a schematic block diagram of a system according to an embodiment of this application.

FIG. 9 shows a data backup system 900 according to an embodiment of this application. The system 900 includes:
the data backup apparatus 500 in the embodiment shown in FIG. 5 and the data backup apparatus 700 in the embodiment shown in FIG. 7.

In some embodiments, the data backup system in this embodiment of this application further includes the data backup apparatus 500 in the embodiment shown in the figure, the data backup apparatus 700 in the embodiment shown in FIG. 7, and a management device.

This embodiment of this application further provides a computer storage medium, and the computer storage medium may store a program instruction for indicating any one of the foregoing methods.

In some embodiments, the storage medium may be specifically the memory 630 or 830.

This embodiment of this application further provides a chip system. The chip system includes a processor, configured to support a distributed unit, a first node, and a storage device to implement a function in the foregoing embodiments, for example, generate or process data and/or information in the foregoing methods.

In a possible design, the chip system further includes a memory. The memory is configured to store program instructions and data that are necessary to the distributed unit, the first node, and the storage device. The chip system may include a chip, or may include a chip and another discrete device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data backup method, wherein the method comprises:
obtaining, by a first node, an identifier (ID) of a backup execution node from a storage device; and
backing up, by the first node, data of the first node in the storage device responsive to determining that an ID of the first node is the same as the ID of the backup execution node obtained from the storage device.

2. The method according to claim 1, wherein before obtaining the ID of the backup execution node from the storage device, the method further comprises:
receiving, by the first node, an indication to trigger a backup operation.

3. The method according to claim 1, wherein the method further comprises:
obtaining, by the first node, last backup information from the storage device; and
wherein the backing up data of the first node in the storage device comprises:
determining, by the first node based on the last backup information, new data to be backed up in the first node, and performing an incremental backup on the new data in the storage device.

4. The method according to claim 1, wherein the method further comprises:
obtaining, by the first node, last backup information from the storage device; and
wherein the backing up data of the first node in the storage device comprises:
determining, by the first node based on the last backup information, new data to be backed up in the first node, and performing an incremental backup on the new data in the storage device responsive to determining that a data amount of the new data is greater than a preset data amount.

5. The method according to claim 1, wherein the method further comprises:
indicating, by the first node, to the storage device to delete data whose storage time is greater than or equal to a preset time threshold.

6. A data backup method, wherein the method comprises:
obtaining, by a storage device, an identifier (ID) of a backup execution node;
sending, by the storage device, the ID of the backup execution node to a first node; and
receiving, by the storage device, data of the first node, wherein an ID of the first node is the same as the ID of the backup execution node.

7. The method according to claim 6, wherein the method further comprises:
obtaining, by the storage device, last backup information;
sending, by the storage device, the last backup information to the first node, wherein the last backup information is used to determine new data to be backed up in the first node; and
wherein the receiving data of the first node in the storage device comprises:
receiving, by the storage device, the new data.

8. The method according to claim 6, wherein the method further comprises:
deleting, by the storage device, data whose storage time is greater than or equal to a preset time threshold.

9. A data backup apparatus, wherein the apparatus comprises a processor and a memory, and wherein the processor executes computer-executable instructions stored in the memory, that cause the data backup apparatus to be configured to:
obtain an identifier (ID) of a backup execution node from a storage device; and
back up data of the first node in the storage device responsive to determining that an ID of the first node is the same as the ID of the backup execution node.

10. The data backup apparatus according to claim 9, wherein the data backup apparatus is configured to:
receive an indication used to trigger a backup operation.

11. The data backup apparatus according to claim 9, wherein the data backup apparatus is configured to:
obtain last backup information from the storage device; and
determine, based on the last backup information, new data to be backed up in the first node, and perform incremental backup on the new data in the storage device.

12. The data backup apparatus according to claim 9, wherein the data backup apparatus is configured to:

obtain last backup information from the storage device; and determine, based on the last backup information, new data to be backed up in the first node, and perform incremental backup on the new data in the storage device responsive to determining that a data amount of the new data is greater than a preset data amount.

13. The data backup apparatus according to claim 9, wherein the data backup apparatus is configured to indicate to the storage device to delete data whose storage time is greater than or equal to a preset time threshold.

* * * * *

UNITED STATES PATENT AND TRADEMARK OFFICE
CERTIFICATE OF CORRECTION

| | | |
|---|---|---|
| PATENT NO. | : 11,907,561 B2 | Page 1 of 1 |
| APPLICATION NO. | : 16/928677 | |
| DATED | : February 20, 2024 | |
| INVENTOR(S) | : He et al. | |

It is certified that error appears in the above-identified patent and that said Letters Patent is hereby corrected as shown below:

On the Title Page (71) Applicant, Left-Hand Column, Line 2: "Gutan" should read -- Gui'an --.

Signed and Sealed this
Fifteenth Day of October, 2024

*Katherine Kelly Vidal*

Katherine Kelly Vidal
*Director of the United States Patent and Trademark Office*